United States Patent
Verleene

(10) Patent No.: US 11,919,265 B2
(45) Date of Patent: Mar. 5, 2024

(54) METHOD FOR MANUFACTURING A MOLD SEGMENT FOR CURING AND VULCANIZING A TIRE

(71) Applicant: COMPAGNIE GENERALE DES ETABLISSEMENTS MICHELIN, Clermont-Ferrand (FR)

(72) Inventor: Stephanie Verleene, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 878 days.

(21) Appl. No.: 16/962,959

(22) PCT Filed: Jan. 18, 2019

(86) PCT No.: PCT/FR2019/050104
§ 371 (c)(1),
(2) Date: Jul. 17, 2020

(87) PCT Pub. No.: WO2019/141949
PCT Pub. Date: Jul. 25, 2019

(65) Prior Publication Data
US 2020/0338790 A1    Oct. 29, 2020

(30) Foreign Application Priority Data

Jan. 18, 2018 (FR) ...................... 1850399

(51) Int. Cl.
*B22D 17/00* (2006.01)
*B22F 10/28* (2021.01)
(Continued)

(52) U.S. Cl.
CPC .......... *B29D 30/0606* (2013.01); *B22F 10/28* (2021.01); *B22F 10/50* (2021.01);
(Continued)

(58) Field of Classification Search
CPC ...... B22D 17/00; B29D 30/0606; B24C 1/10; B29C 33/3842
(Continued)

(56) References Cited

U.S. PATENT DOCUMENTS

| 2018/0147748 A1 | 5/2018 | Jenkins et al. |
| 2019/0022824 A1 | 1/2019 | Miyasaka |

FOREIGN PATENT DOCUMENTS

| FR | 2970663 A1 | 7/2012 |
| KR | 10-2013-0068468 A | 6/2013 |

(Continued)

OTHER PUBLICATIONS

Machine translation of WO 03/099535 A1 (Year: 2003).*
(Continued)

*Primary Examiner* — Kevin P Kerns
(74) *Attorney, Agent, or Firm* — VENABLE LLP

(57) ABSTRACT

A method for manufacturing an aluminium mould (1) segment (10) for curing and vulcanizing a tyre comprises: a) fixing at least one thin blade (2) for the formation of the grooves in the tire tread, in a mould form made of friable material, so that an exterior part of the thin blade is embedded in the material of the mould form and so that an interior part projects from this mould form, this thin blade being made from maraging steel and having been obtained by a selective laser melting method, b) closing the mould form and pouring or injecting aluminium into it, coating the interior part of the thin blade, c) breaking away the mould form to obtain the mould segment. The thin blade (2) is subjected to a peening treatment with a material with a Vickers hardness between 340 and 500 HV and with dimensions smaller than 0.3 mm.

7 Claims, 3 Drawing Sheets

(51) Int. Cl.
    *B22F 10/50*     (2021.01)
    *B24C 1/10*     (2006.01)
    *B29C 33/38*     (2006.01)
    *B29D 30/06*     (2006.01)
    *C22F 1/04*     (2006.01)

(52) U.S. Cl.
    CPC ............ *B24C 1/10* (2013.01); *B29C 33/3842* (2013.01); *C22F 1/04* (2013.01); *B29D 2030/0613* (2013.01); *B29K 2905/02* (2013.01)

(58) Field of Classification Search
    USPC .............................................. 164/6, 15, 137
    See application file for complete search history.

(56) References Cited

FOREIGN PATENT DOCUMENTS

| | | | |
|---|---|---|---|
| WO | WO 03/099535 A1 * | 12/2003 | ......... B29D 30/0606 |
| WO | 2016/128087 A1 | 8/2016 | |
| WO | 2016/200695 A1 | 12/2016 | |
| WO | 2017/175463 A1 | 10/2017 | |

OTHER PUBLICATIONS

International Search Report dated Apr. 4, 2019, in corresponding PCT/FR2019/050104 (6 pages).
A. Vaajoki, "Post-processing of AM specimens", SMACC Välkky Workshop, pp. 1-39, retrieved from the internet: http://smacc.fi/wp-content/uploads/2017/05Välkky_Post-processing.pdf (Jun. 15, 2017).

* cited by examiner

METHOD FOR MANUFACTURING A MOLD SEGMENT FOR CURING AND VULCANIZING A TIRE

GENERAL TECHNICAL FIELD

The invention relates to a method for manufacturing an aluminium mould segment for curing and vulcanizing a tyre.

PRIOR ART

A mould for curing and vulcanizing a tyre conventionally has an annular shape and its interior wall is provided with projecting elements, known as "thin blades" which are used for forming the grooves in the tread of the tyre. Such a mould will be described in greater detail later.

These thin blades are made for example of maraging steel. One option is to produce them using "selective laser melting".

As an aide-memoire, it will be recalled that "selective laser melting" is an additive-manufacturing method which consists in melting and then welding together thin layers of metallic powders by scanning using a laser beam, in order to obtain a part.

Such a method has the disadvantage of generating a coarse surface finish on the part produced. This surface finish may encourage the formation of points of weakness, or in other words points at which cracks may begin, and from which the cracks spread more quickly. This leads to a reduction in fatigue life.

Furthermore, when this method is employed for the manufacture of parts made of maraging steel (for example the aforementioned thin blades), mini tempering operations take place, as a result of the temperature increase during the laser melting, followed by the rapid cooling. These mini tempering operations do not make it possible to create a clearly-defined crystal structure with precipitates, namely a material structure that is uniform and well-organised, but rather lead to a heterogeneous hybride state with the segregation of chemical elements, namely local impoverishment and local accumulation of chemical elements.

During the manufacture of a tyre curing and vulcanizing mould, one method that can be used involves manufacturing a first pattern comprising the grooves of the tread of the future tyre, and then, from this first pattern, manufacturing a mould of inverse shape from a flexible material (for example from silicon-based resin SILASTENE®) and then, from this mould, making a second pattern from a friable material corresponding to the profile of the tyre and then, from this second pattern, making the definitive mould.

This definitive mould is obtained by pouring aluminium around thin blades made of maraging steel which have been obtained using the aforementioned selective laser melting method, these thin blades being shaped to conform to the shape of the grooves of the tread. The pouring of the aluminium around these thin blades gives rise to a further increase in the temperature thereof, and amplifies the segregation of chemical elements.

The nonuniform microstructure and this segregation make the thin blade made of maraging steel fragile and brittle, notably with a drop in the elongation of the material, making it not very strong, once the elastic-deformation zone has been crossed. This likewise reduces the fatigue life.

This may cause the thin blades to break when the mould is being used for the manufacture of the tyres.

A method for the heat treatment of a maraging steel is known from the site www.aircraftmaterials.com/data/nickel/C300.html, and consists in heating it up to a temperature of 816° C., and then reducing the temperature to an annealing temperature of 482° C. in order to achieve a peak of maximum hardness. However, such a treatment has the effect of making the steel more fragile still, and goes against the desired effect.

Document WO 2016/128087 discloses a method for manufacturing a thin blade for forming grooves in a tyre tread, this method employing selective laser melting of a metal powder.

The thin blades are manufactured separately and are inserted and anchored in slots formed inside the segments of a mould for vulcanizing vehicle tyres. That document specifies that the segments of the mould are manufactured by casting a low melting point metal, for example aluminium. However, it is not specified how the thin blades are anchored in the mould.

Furthermore, that document makes absolutely no mention of steps of peening the said thin blades.

Document WO 2016/200695 describes thin blades for forming the grooves in the tread of a tyre and specifies that these thin blades can be manufactured using a 3D printing method employing laser sintering. The base of these thin blades is embedded in the body of the segment of the tyre curing and vulcanizing mould.

That document likewise does not describe the method of peening these thin blades.

Document WO 2017/175463 describes a method for the surface treatment of a metal mould with a view to improving its life and surface finish. That method comprises a step of peening using powdered carbide, graphite or diamond. This peening is achieved by blasting the particles under pressure.

However, that document is not in any way concerned with a tyre curing and vulcanizing mould. In addition, it gives no indication as to the positive impact of peening on a thin blade obtained using a selective laser melting method.

Finally, the article by A. Vaajoki "Post processing of AM specimens, SMACC Vääkky worshop" describes in general terms a method for peening the surface of a metallic product and mentions the use of ceramic beads based in particular on zirconium oxide, with a size comprised between 0.125 mm and 0.250 mm and at a pressure of 3 to 4 bar.

No indication is given as to the beneficial effect that such peening might have on a thin blade manufactured using a selective laser melting method.

SUMMARY OF THE INVENTION

It is therefore an object of the invention to propose a method for manufacturing an aluminium mould for curing and vulcanizing a tyre, which alleviates the above-mentioned disadvantages.

To this end, the invention relates to the method for manufacturing an aluminium mould segment for curing and vulcanizing a tyre, which comprises the following steps involving:

a) fixing at least one thin blade for the formation of the grooves in the tread of the said tyre, in a mould form made of friable material, the shape of which is the negative of the said mould segment that is to be obtained, so that a so-called "exterior" part of the said thin blade is embedded in the material of the mould form and so that a so-called "interior" part of the thin blade projects from this mould form, this thin blade being made from maraging steel and having been obtained by a selective laser melting method, b) closing the mould form and pouring or injecting aluminium into it, coating the said interior part of the thin blade so as to fix it in place, c) breaking the said mould form in order to obtain the said mould segment, from the bottom of which the exterior part of the said thin blade projects.

According to the invention, the said thin blade is subjected to a peening treatment which involves blasting it with shot particles, such as beads, made from a material with a Vickers hardness comprised between 340 and 500 HV and with dimensions smaller than 0.3 mm.

By virtue of these features of the invention, the thin blades of the mould obtained have a better fatigue life.

According to other advantageous and non-limiting features of the invention, considered alone or in combination:
- the shot particles are made of cast steel or of ceramic, such as a ceramic containing zirconium dioxide, silicon dioxide and alumina;
- the shot particles have a dimension of around 0.1 mm;
- the coverage of the peening treatment is comprised between 200% and 600%;
- the peening is performed at a pressure of between $1.5 \times 10^5$ Pa and $3.5 \times 10^5$ Pa;
- the step of peening the thin blade is performed before step a);
- the step of peening the thin blade is performed after step c).

BRIEF DESCRIPTION OF THE FIGURES

Further features and advantages of the invention will become apparent from the description which will now be given thereof, with reference to the appended drawings which depict, by way of non-limiting example, one possible embodiment thereof.

In these drawings.

DETAILED DESCRIPTION

The mould manufacturing method will now be described in greater detail.

Figure 2:
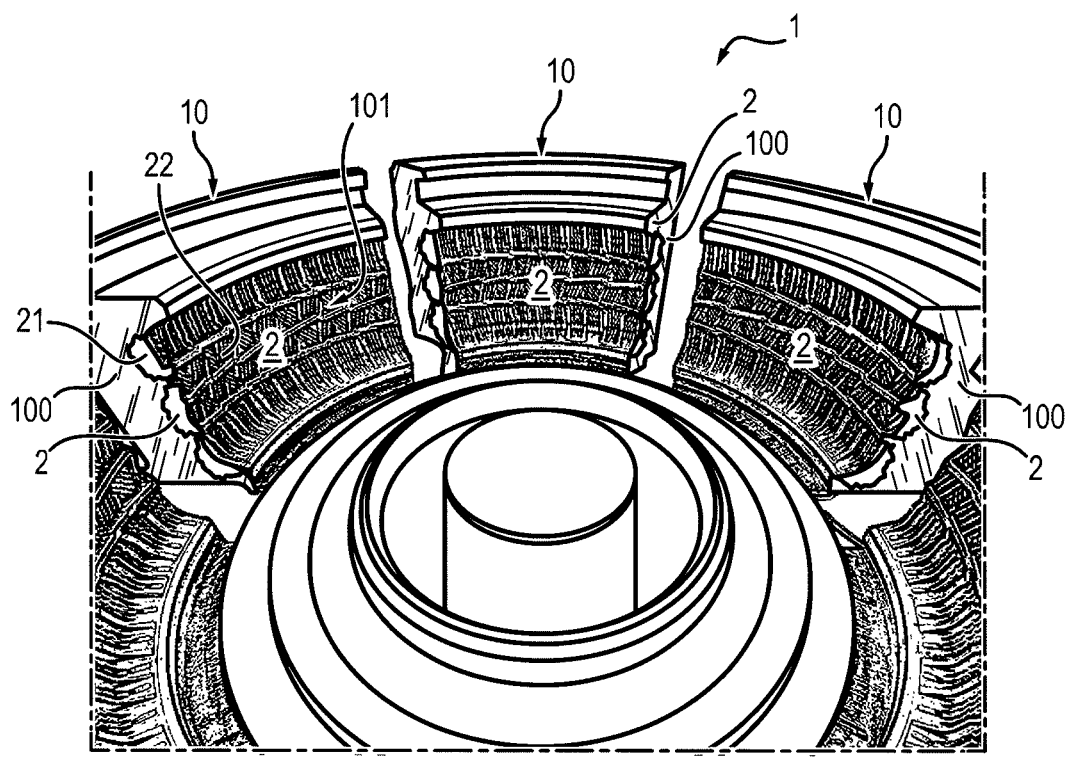
FIG. 2 is one exemplary embodiment of a tyre curing and vulcanizing mould equipped with at least one of the aforementioned thin blades.

It consists in producing a mould 1 like the one depicted in FIG. 2. This mould 1, of annular overall shape, is made up of a plurality of curved mould segments 10, shaped as portions of an annulus in the shape of arcs of a circle, which are intended to be assembled in order, together, to form the annular mould 1. Each mould segment 10 has, on its concave interior surface 101, several thin blades 2, shaped to exhibit the shape of the grooves in the tread.

Figure 1:
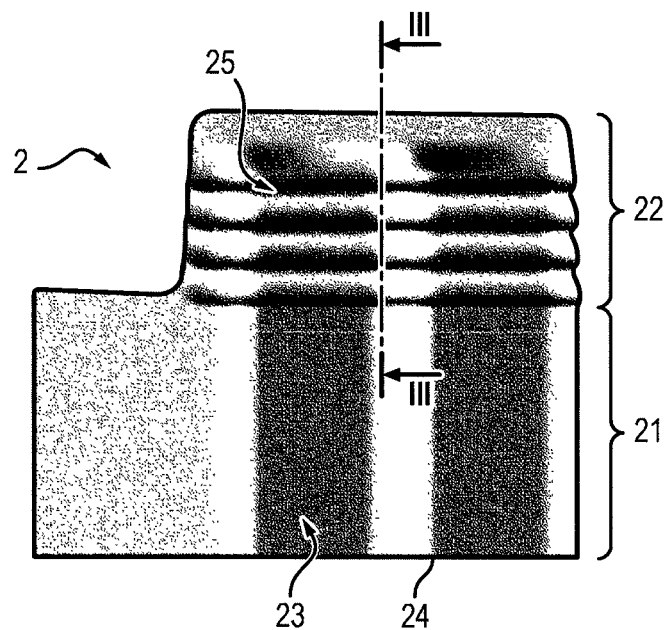
FIG. 1 is a perspective view of one exemplary embodiment of a thin blade made of maraging steel for forming grooves in the treads of tyres.

More specifically, one exemplary embodiment of such a thin blade 2 can be seen by referring to FIG. 1.

The thin blade 2 has a wavy shape. It comprises two parts, namely a part 21 referred to as "interior" because it is intended to be embedded in the aluminium that constitutes the rear 100 of a mould segment 10, and a part 22 referred to as "exterior" because it is intended to project from the rear of the mould segment towards the centre of the mould 1.

Figure 5:
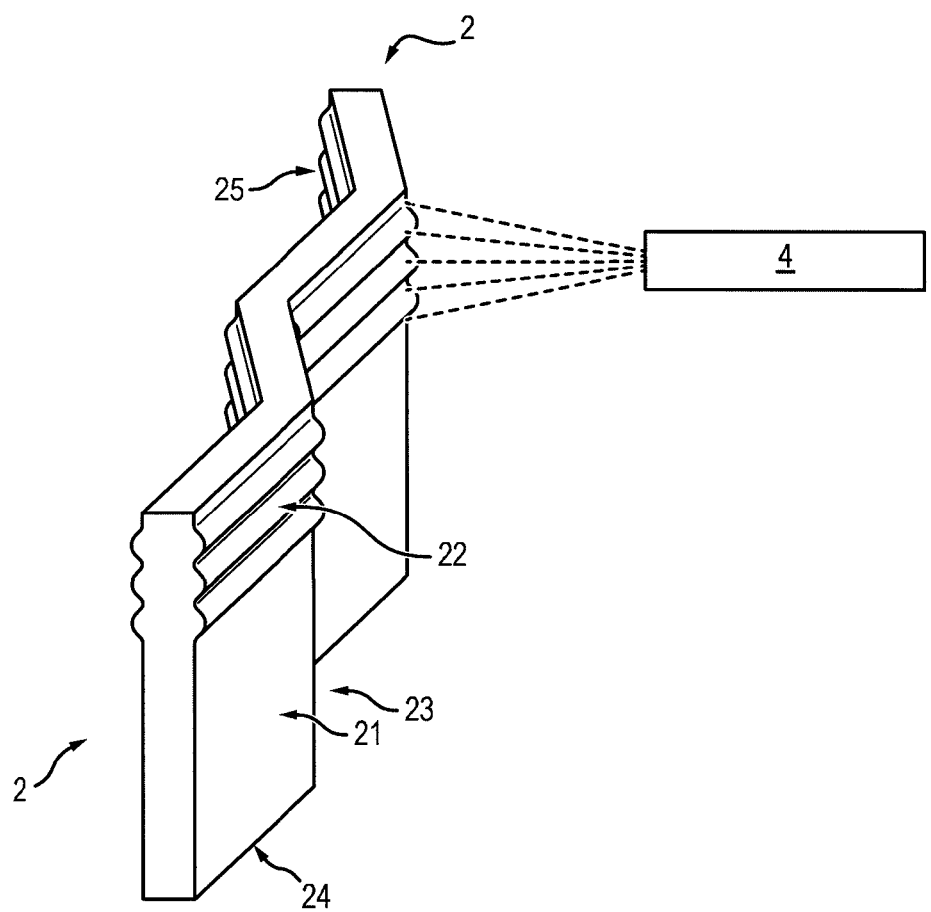
FIG. 5 is a diagram depicting one of the steps of the method of manufacture according to the invention.

The thin blade 2 has, on its two opposite lateral faces, large undulations 23 of which the generatrix is perpendicular to the base 24 of the interior part 21 (see also FIG. 5)

The exterior part 22 also has, on these two opposite lateral faces, a plurality of small undulations 25 which are perpendicular to the large undulations 23.

Figure 3:
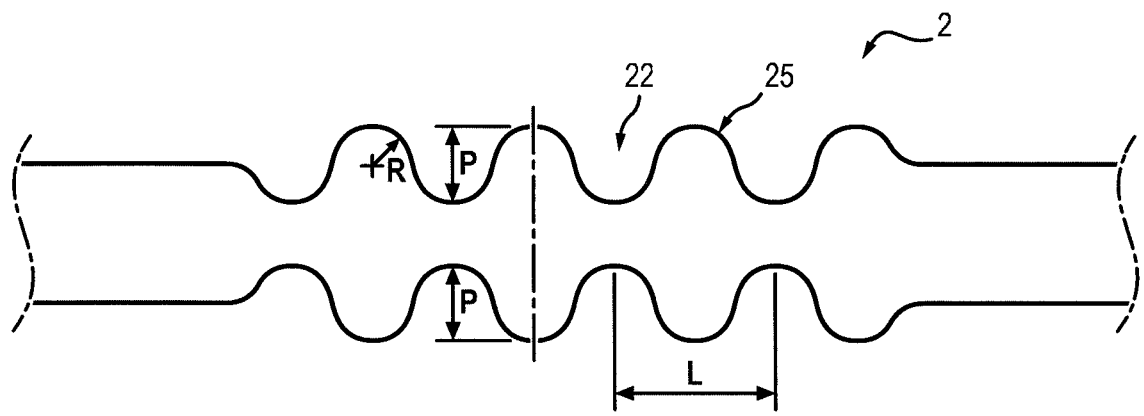
FIG. 3 is a view in transverse section, on the plane of section passing through the line III-III of FIG. 1, FIGS. 4a and 4b are diagrams depicting certain steps in the method of manufacture according to the invention.

In the view in cross section of FIG. 3, it may be seen that the small undulations 25 have small dimensions. Thus, purely by way of illustration and for the example of thin blade 2 depicted in the figures, the depth P of the undulations is of the order of 0.8 mm, the distance L between two successive troughs is equal to 1.65 mm, and the radius R of the rounded crest of an undulation is of the order of 0.41 mm.

This shows that the thin blades have recessed regions of small dimensions that are difficult to reach.

The thin blades 2 may obviously have different shapes according to the contours to be given to the grooves in the tread of the tyre. However, they very often exhibit regions that are difficult to access, such as those described hereinabove.

The said thin blade 2 is made of maraging steel, and has been obtained by selective laser melting.

The maraging steel employed here is preferably a steel containing, in the conventional way, a percentage of carbon less than or equal to 0.03%, a nickel content of between 17% and 19%, a cobalt content of between 8.5% and 9.5%, a molybdenum content of between 4.5% and 5.2%, a titanium content of between 0% and 0.8%, an aluminium content of between 0% and 0.15%, a chromium content of between 0% and 0.5%, a copper content of between 0% and 0.5%, a silicon content of between 0% and 0.1%, a manganese content of between 0% and 0.1%, a sulfur content of between 0% and 0.01%, a phosphorus content of between 0% and 0.01%, the remainder being iron, (these percentages being expressed by weight with respect to the total weight of the product). This steel has a martensitic structure.

This steel exhibits the following properties, after solution heat treatment followed by ageing: high Vickers hardness (>550HV), good properties under tension (Re>1500 MPa, Rm>1600 MPa) and in terms of fatigue, low thermal expansion coefficient less than or equal to $10.2 \times 10^{-6}$ m/m. ° C.

When this maraging steel has been obtained by a method of selective laser melting (SLM), namely by an additive manufacturing method, it also has specific properties inherent to additive manufacturing without a post-heat treatment, such as a very fine microstructure (brought about by the significant thermal gradients associated with this method), which is beneficial to certain properties such as the elastic limit (>800 MPa), the load at break (>900 MPa) and the Vickers hardness (>380 HV).

Figure 4A:
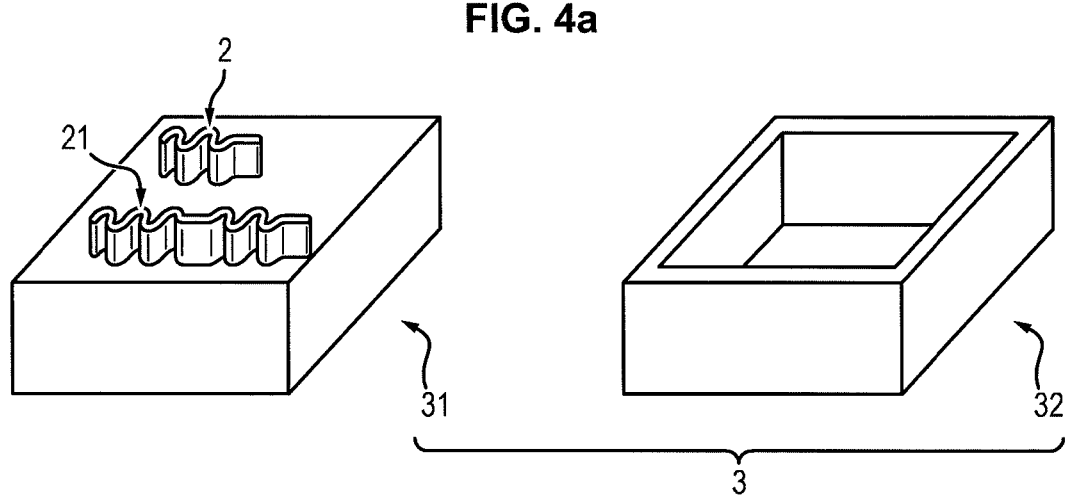

The method for manufacturing the segment 10 of a mould 1 according to the invention will now be described in greater detail in conjunction with FIG. 4a.

According to that figure, at least one thin blade 2 and preferably a plurality of thin blades are fixed in a mould form 3 made of a friable material. The mould form 3 generally comprises several parts, in this instance two, referenced 31 and 32, respectively.

This mould form 3 has been obtained beforehand, for example as described hereinabove by the first of all manufacturing a first pattern or prototype which corresponds to the shape of the tyre that is to be produced, including its tread grooves. A second pattern made from a flexible material, for example from silicon-based resin SILASTENE®, is then moulded on this first pattern.

The mould form 3 is produced from this second pattern. It is made from a friable material, such as plaster for example, and the various thin blades 2 are inserted therein, so that their exterior part 22 is embedded in the mass of the friable material and so that their interior part 21 projects.

Figure 4B:
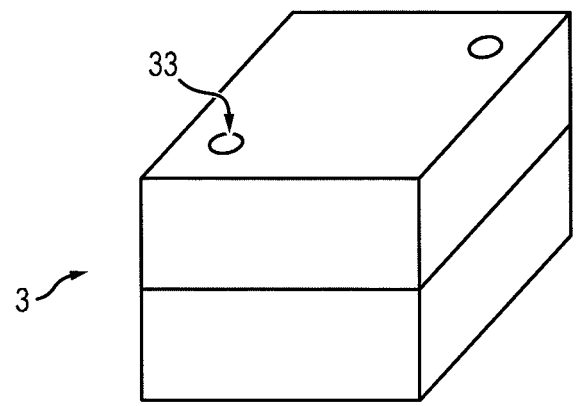

Furthermore, in the example depicted in FIG. 4, the second part 32 of the mould form 3 is used to produce the rear 100 of the mould segment 10. The various parts 31, 32 of the mould form 3 are then closed, as depicted in FIG. 4b.

The aluminium is then poured or injected, for example through one or more orifices 33.

After cooling, the various parts of the mould form 3 made of friable material are broken away, making it possible to obtain a mould segment 10, as depicted in FIG. 2, and which therefore comprises a rear part 100 (or bottom) from which the exterior parts 22 of the various thin blades 2 project. The interior parts 21 of the thin blades 2 are embedded and therefore fixed in the aluminium.

According to the invention, the thin blades 2 are subjected to a treatment with shot known as "shot peening".

As depicted in FIG. 5, this shot peening is performed using a device 4 that blasts shot particles, such as beads, at high pressure, these then being blasted at high speed onto the exterior surface of the thin blade 2 and more particularly onto the exterior part 22 thereof. The device 4 is moved in such a way as to treat the entire surface.

It is possible to use blasting (peening) devices that differ according to the geometry of the part that is to be treated, the desired quality, etc. The projectiles may for example be blasted using a compressed-air system, a machine involving a turbine or a system in which ultrasound is used to induce movement. Multiple nozzles pre-arranged at the appropriate angles of impact and at the appropriate distance optimize the final quality obtained on the part.

This blasting of shot particles onto the thin blade 2 has the effect of improving its surface condition. The high velocity shot impact creates residual compressive stresses at the surface which significantly improve the fatigue life of the said thin blade.

This peening operation can be performed either on the thin blade 2 after it has been manufactured and before it is inserted into the mould form 3, this treatment preferably being performed on the exterior part 22.

Or, the peening may be performed once the mould segment 10 is finished and when the thin blade 2 is inserted in this segment.

Tests have been carried out in order to determine the best blasting conditions for obtaining the desired effect.

The results have shown that it was preferable to use particles with dimensions smaller than or equal to 0.3 mm, more preferably still, with dimensions equal to 0.1 mm, or close to 0.1 mm. In the case of beads, this dimension will be the diameter. As a preference also, these beads have a Vickers hardness comprised between 340 and 500 HV.

Advantageously, these shot particles are made of cast steel, which may or may not contain chromium, or else of ceramic, for example a ceramic based on zirconium dioxide ($ZrO_2$), silicon dioxide ($SiO_2$) and alumina ($Al_2O_3$).

As a preference, the coverage, namely the number of passes of the device 4, is comprised between 200% and 600%, or in other words the particles are blasted onto the same surface between two and six times.

The pressure used is advantageously comprised between 1.5 bar ($1.5 \times 10^5$ Pa) and 3.5 bar ($3.5 \times 10^5$ Pa).

Finally, the device 4 can be moved (back and forth) along its axis, in order to maintain the same distance between the end of the blasting nozzle and the thin blade that is being treated.

Observations using an electron microscope also show a marked improvement in the surface condition of the thin blade.

Additional tests have demonstrated an improvement of between 75% and 450% in terms of fatigue life for the parts which have undergone the method according to the invention (peening followed by the pouring of the aluminium) as compared with parts which have not undergone the peening treatment.

The invention claimed is:

1. A method for manufacturing an aluminum mold segment for curing and vulcanizing a tire, the method comprising:
    (a) fixing at least one thin blade for formation of grooves in a tread of the tire in a mold form made of friable material, a shape of which is a negative of the mold segment that is to be obtained, such that an exterior part of the at least one thin blade is embedded in the material of the mold form and an interior part of the at least one thin blade projects from the mold form, the at least one thin blade being made from maraging steel and having been obtained by a selective laser melting method;
    (b) closing the mold form and pouring or injecting aluminum into the mold form, coating the interior part of the at least one thin blade to fix it in place; and
    (c) breaking the mold form to obtain the mold segment from a bottom of which the exterior part of the at least one thin blade projects,
    wherein the at least one thin blade is subjected to a peening treatment including blasting it with shot particles made from a material with a Vickers hardness between 340 and 500 HV and with dimensions smaller than 0.3 mm.

2. The method according to claim 1, wherein the shot particles are made of cast steel or of ceramic.

3. The method according to claim 1, wherein the shot particles have a dimension of around 0.1 mm.

4. The method according to claim 1, wherein a coverage of the peening treatment is between 200% and 600%.

5. The method according to claim 1, wherein the peening treatment is performed at a pressure of between $1.5 \times 10^5$ Pa and $3.5 \times 10^5$ Pa.

6. The method according to claim 1, wherein the peening treatment is performed before step (a).

7. The method according to claim 1, wherein the peening treatment is performed after step (c).

* * * * *